July 3, 1956     F. A. PRAHL, JR     2,753,088
CONTAINER
Filed Jan. 18, 1956
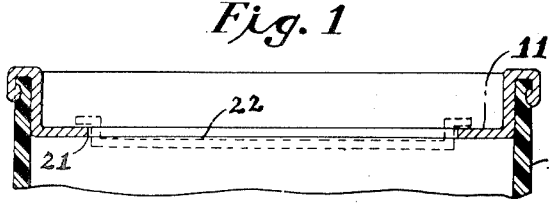
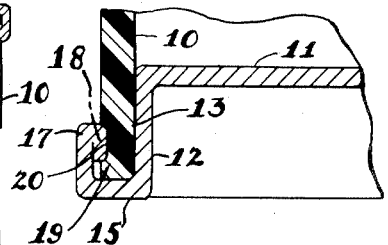
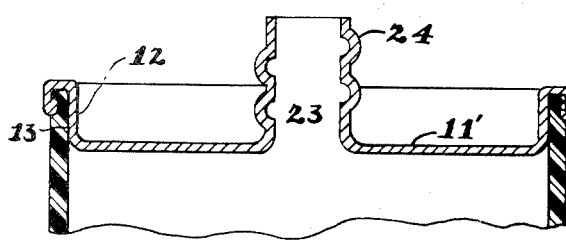
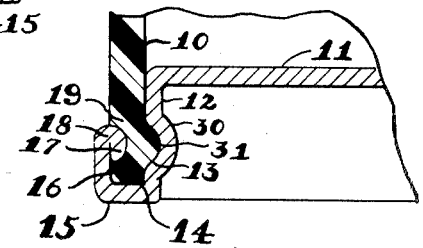
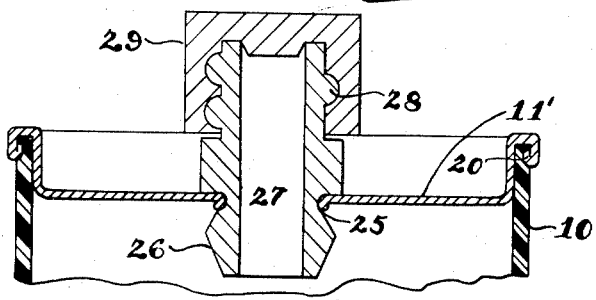
INVENTOR
Frederick A. Prahl, Jr.
BY Cushman, Darby & Cushman
ATTORNEYS United States Patent Office 2,753,088
Patented July 3, 1956

2,753,088

CONTAINER

Frederick A. Prahl, Jr., Harvard, Mass., assignor to Bradley Container Corporation, Maynard, Mass., a corporation of Delaware Application January 18, 1956, Serial No. 559,828

7 Claims. (Cl. 222—215)

This invention relates to "squeeze-to-use" containers having a relatively thin body wall of plastic material such as a polymer or a copolymer of a monomer containing a vinyl-type radical, namely, a polymer of a polymerizable compound having an ethylenic carbon (C=C) to carbon double bond and of uniform thickness, e. g., about 0.010 inch or more. The term "polymer" is intended to include both homopolymers of ethylenically unsaturated compounds and copolymers of such compounds, as well as polymeric vinyl compounds which do not exist in the monomeric state, e. g., polyvinyl acetals, such as polyvinyl formal and polyvinyl butyral.

Typical examples of polymeric materials which can be used, in addition to the just-mentioned polyvinyl acetals are polyethylene, polyvinyl chloride, polyvinylidene chloride polystyrene, polymethyl alpha chloroacrylate, polyacrylates and methacrylates, e. g., polymethyl methacrylate, polybutyl methacrylate, polymethyl acrylate, polyvinyl acetate, polymeric alpha methyl styrene, polyvinyl toluene, polypropylene, polyacrylonitrile and polyisobutylene. As copolymers there can be used copolymers of these materials with each other or with other copolymerizable compounds, e. g., vinyl chloride-vinyl acetate copolymer, vinyl chloride-acrylonitrile copolymer, vinyl acetate-acrylonitrile copolymer, vinyl chloride-vinyl acetate-maleic anhydride terpolymer, vinyl chloride-methyl vinyl ether copolymer, vinylidene chloride-vinyl chloride copolymer, vinylidene chloride-acrylonitrile copolymer, vinylidene chloride-trichloroethylene copolymer, styrene-acrylonitrile copolymer, rubbery polymers and copolymers, such as natural rubber, butadiene-styrene copolymer (GR—S), butadiene-acrylonitrile copolymer, butadiene-isobutylene copolymer and isoprene-isobutylene copolymer. It will be noted that most of the above materials are polymers or copolymers of vinyl or vinylidene compounds. The vinylidene chloride resins are available commercially under the name "Saran," made by the Dow Chemical Company.

The general objective of the invention is to provide an improved "squeeze-to-use" container which has excellent functional characteristics and is adaptable to high speed fabrication of the container and found adaptable to high speed production packaging. Many "squeeze-to-use" containers available today have acceptable functional characteristics but require special techniques and new equipment for packaging which limits their market because of economic reasons. My invention provides a package which is readily adaptable to existing high speed automatic filling and closing machinery, which art has reached a high level of machine development.

The primary object of the invention is to provide a "squeeze-to-use" type container having a metal bottom or end permanently attached to the lower marginal portion of the body wall and a similar top forming an overall closure like the bottom, but provided, in some cases, with an opening to receive a closure, e. g., a removable and replaceable closure, such as a pressed-in disc or suitable cap. The metal top may be an all-over top similar to the bottom, in which holes are punched with a sharp instrument or an alternate construction would have pre-scored openings in the metal top which could be pushed out to make an opening or openings through which the contents could be expelled.

The metal top may be provided with one of many common types of dispensing heads for liquids, pastes and powders. These dispensing heads may be integrally attached to the top metal end closure or they may be a snap-in type of resilient plastic which is frictionally inserted into and thus held in an opening in the metal end.

An alternate construction of a "squeeze-to-use" type container may have a plastic body provided with a metal end or bottom end and a similar top having a conventional integral threaded neck and cap.

A "squeeze-to-use" container possesses certain peculiar characteristics which are totally different from ordinary containers whose only function is a package for material. A satisfactory "squeeze-to-use" container must have the correct balance between wall flexibility and stiffness to produce the proper action for expelling the contents. The body material must be extremely flexible in order for the container wall to be collapsed with a minimum of pressure. Yet, in order for the container to have the proper recovery, that is, spring back to its normal shape after squeezing, the body wall must have a certain amount of stiffness. In order to withstand multiple flexing as the container is squeezed during its useful life, the container wall material must have great tensile strength and resistance to fatigue.

The material requirement for the product disclosed in the present invention has one additional very important characteristic, namely, that of pliability or deformability. In the present invention the metal end actually forms a mechanical lock with the marginal edge of the plastic body wall by embedding the rolled edge of the metal end into the outer surface of the plastic body wall. It is important that this lock not produce an undue stress or cold flow of the material and weaken the container at this point. This requirement is met in the present invention by using plastic material of uniform wall thickness which has no strain pattern. The plastic body used in the present invention has been fabricated and treated in such manner as to relieve all strains in the plastic.

The present invention encompasses a "squeeze-to-use" container with a plastic body wall of uniform thickness of the range of about 10 to 50 thousandths of an inch. Preferably the variations in thickness, i. e., tolerance, of the wall of the body of the container, should not be over 5 to 10% of the specified or nominal wall thickness. This uniformity of wall thickness is necessary to make a permanent seal by using conventional metal end seaming methods and equipment without danger of perforating the plastic wall or producing undue stress at the seam such as would cause incipient scoring or cutting resulting, upon repeated squeezing, a crack growth and ultimate rupture and failure of the wall of the container. The plastic material employed in the body wall is a stable and tough material having the softness, flexibility and resilience characteristic of plastics such as polyethylene which has properly been plasticized, or the other materials mentioned above. The selection of conventional plasticizers will be determined so as to give softness enough to afford squeezability and stiffness enough to assure return to shape and plasticity enough to allow deformation to produce a mechanical lock at the seam without cutting through. The "squeeze-to-use" container of the present invention exhibits great bursting strength with a wall thickness of the range specified above. Laboratory tests have been made on production containers of 1½ inch in diameter and 5 inches long with a .032 inch wall thickness, using up to 50 pounds per square inch internal pressure, with no evidence of failure. Preferred materials used in the present invention do not become brittle or crack with age, or at extremely low temperature, and tests have shown that when made of polyethylene, they will remain flexible down to −10° F.

In some applications the plastic body wall material for the "squeeze-to-use" container will be clear or translucent to allow the user to see the amount of material remaining in the container. In other applications pigment is added to the plastic body wall material to make the "squeeze-to-use" container opaque and, in addition, various shades of color are possible for styling of the commercial package.

Where it is necessary or desirable to have a "squeeze-to-use" container with only plastic material exposed to contents in the container, metal ends with plastic laminated to their inside surfaces can be used. It is also desirable, in some cases, to coat the interior surfaces of the ends with conventional protective and resistant coatings, lacquers and waxes. It is also desirable, in some cases, to lay a sheet of plastic film over the end of the container and position the metal end in place so that the subsequent seaming, i. e., clinching operation will lock the periphery of the plastic film between the rolled edge of the metal end and the end portion of the plastic body wall.

Referring to the drawings:

Figure 1 is a section of a container having a plastic body and metal ends, the top being formed with an opening receiving a pressed-in or snap-in type of cap;

Figure 2 is a detail section showing the manner in which the metal end engages the plastic body to form a permanent seal therewith;

Figure 3 is a view similar to Figure 2 showing a modification thereof;

Figure 4 is a sectional view showing the metal top forming with an integral threaded cap-receiving neck;

Figure 5 is a view similar to Figure 4 showing the neck of different material from the metal end, such as plastic, with a cap attached;

Figure 6 is a fragmentary section of a container having a metal end attached thereto and coated with a film of a suitable protective and resistant material; and Figure 7 is a fragmentary, side elevational view of containers in stacked position.

The cylindrical body 10 is formed of polyethylene, polyvinyl chloride, polyvinylidene chloride, or other plastic, as mentioned above, having a thinness and flexibility to allow it to be squeezed to expel the contents, which may be powder, liquid, paste, etc., and recover after such squeezing.

The bottom or end of metal has a cup-shaped or a central disc portion 11, as shown, and is connected to the body in inverted position whereby its peripheral wall or skirt 12 closely engages the adjacent, inner, lower marginal wall area 13 of the body. The lower edge 14 of the body is in engagement with the upper surface of the flange 15 of the end 11, as at 16, and the circular edge 17 of the flange 15 is turned or curled upwardly and inwardly, as at 18, and the rolled or beaded edge 17 is crimped or clinched at circumferentially closely spaced points or circumferentially continuously into the material of the outer, lower, marginal area 19 of the body, as shown at 20 in Figure 2. This is accomplished by conventional equipment utilizing either a rolling action or segmental jaws, and the connecting of the ends to the body is generically termed "circumferentially clinching" in the claims. This construction provides a permanent and tightly sealed bottom and also a top where employed, as shown in Figures 1 to 7.

In Figure 1, the top 11' is similar to and is attached in a similar manner as the bottom 11. The top 11' may be an overall closure, in which case the top must be punctured to expel the contents, or the metal, cup-shaped top may have, as in Figure 1, a circular opening 21 in which a detachable and replaceable snap-in resilient plug or cap 22 is placed. Such cap may be of metal, rubber or plastic material. The overall closure may have a prescored opening or openings (not shown) which could be punched out and through which, when punched out, powder and the like may be expelled.

Referring to Figure 4 the metal top 11' is provided with an integral upstanding neck 23, screw threaded as at 24, to receive the usual screw cap, and referring to Figure 5, the metal top or end 11' is provided with an opening 25 in which is resiliently held a plug 26 of some suitable plastic material, such as rubbery polyethylene or one of the plastics mentioned above, having an opening 27 therein and a threaded neck 28 receiving a cap 29.

Referring to Figure 3, the skirt 12 of the end 11 is provided with a circular projection 30 into which the material of the body 10 of the container is compressed, as shown at 31, when the end is applied to the container.

Referring to Figure 6, the bottom 11 is the same as previously described but, in addition, has a layer or film of a suitable protective and resistant material 41 thereon, as shown, such as polyethylene, polyvinyl chloride, etc. This plastic film 41 may be a separate sheet which is fastened temporarily to the metal bottom 11, and when the metal end is seamed onto the plastic body wall the periphery of the film sheet 41 is crimped or clinched circumferentially continuously as shown.

It will thus be seen that I have provided a "squeeze-to-use" container having a flexible body wall 10 of plastic material, with a metallic end closure 11—11' receiving the edge of the body at either end, said closure engaging the inner wall surface of the body, as shown at 12—13, the adjacent end edge thereof, as shown at 14—15, and having a rolled edge 18 being embedded in the outer adjacent wall surface of the body, as shown at 20, to form a permanent and tight seal.

The ends 11—11' may be made of various metals, e. g., black plate, stainless steel, tin plate, and aluminum or other sheet metals of non-corrosive materials.

While I have shown in Figure 6, and referred above to, ends coated with a film of plastic such as polyethylene, polyvinyl chloride, polymers of vinylidene chloride, such as "Saran," and the like, the usual commercial types of varnishes, lacquers and coatings employed in lining cans and can ends may be used and frequently will provide less expensive and satisfactory ends from the standpoint of resisting corrosion and not impairing, in any way, the contents.

The body 10 is preferably extruded whereby its construction may be controlled to give a circumferentially uniform wall material thickness throughout the length of the tube. This is highly important in order that the ends which are crimped to the plastic material body wall will produce a tight, continuous seal over the entire circumference of the joint.

The substantial absence of strain in the plastic material of the body wall is accomplished by careful control of the time, temperature and pressure relationships during setting of the plastic or, often, more simply by annealing, as well known in the industry. The strain-free and uniform wall thickness allows the metal ends to be applied without breaking or tearing the marginal portions of the body to which they are attached and, particularly, allows the body to withstand repeated "squeeze-to-use" pressures and flexing without creating leakage at the joint or cracking through the wall of the body.

Referring to Figure 7, the top metal disc 11', which is clinched to the plastic body wall 10, has an opening for receiving a suitable cylindrical closure plug 50. The latter is provided with a circular flange 51 engaging under the edge portion of the wall 52 of an opening in the disc 11', as shown at 52'. The plug is also provided with a circular flange 53 which engages the upper surface of the disc 11' adjacent the opening therein, as shown, and has an upstanding, hollow portion 54 received in the cap 55 which has a flexible, integral extension or connection to the flange 53. In this manner the circular plug 50 is locked in position in the circular opening 52, and the cap 55 is readily removed from the upstanding, hollow portion 54, but cannot be lost since it is permanently connected to the flange 53.

As will be observed from the drawings and the foregoing description, the container bodies are seamless and tubular.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

This application is a continuation-in-part of my copending application Serial No. 486,885, filed February 8, 1955.

I claim:

1. A squeeze-to-use container having a body wall of a polymer of a monomer having a vinyl-type radical, said wall being substantially cylindrical, imperforate, seamless, of single thickness, and flexible and of uniform diameter, the body wall being self-sustaining and of a substantially uniform thickness throughout its length and being squeezable to eject the contents through an opening, and rigid metallic ends, said ends having a central disc portion and an upstanding, continuous, peripheral portion in the form of a circular groove, the free, circular edges and adjacent, marginal portions of the body being enclosed and concealed respectively in said grooves and having the marginal portions and free edges circumferentially clinched and concealed between opposite walls and the tops of said grooves, with the outer walls of the grooves embedded in the outer marginal portions of the body and the inner walls of the grooves coextensively engaging the inner marginal portions of the body whereby the ends are tightly secured to the body and seal the same, an opening in one of said ends, and a closure for said opening.

2. A container according to claim 1 in which the wall is formed of polyethylene.

3. A container according to claim 1 in which the wall is polyvinyl chloride.

4. A container according to claim 1 in which the wall is polyvinylidene chloride.

5. A container according to claim 1 in which the wall is polystyrene.

6. A container according to claim 1 in which the wall is polypropylene.

7. A squeeze-to-use container having a body wall of a plastic material, said wall being substantially cylindrical, imperforate, seamless, of single thickness, and flexible and of uniform diameter, the body wall being self-sustaining and of a substantially uniform thickness throughout its length and being squeezable to eject the contents through an opening, and rigid metallic ends, said ends having a central disc portion and an upstanding, continuous, peripheral portion in the form of a circular groove, the free, circular edges and adjacent, marginal portions of the body being enclosed and concealed respectively in said grooves and having the marginal portions and free edges circumferentially clinched and concealed between opposite walls and the tops of said grooves, with the outer walls of the grooves embedded in the outer marginal portions of the body and the inner walls of the grooves coextensively engaging the inner marginal portions of the body whereby the ends are tightly secured to the body and seal the same, an opening in one of said ends, and a closure for said opening.

References Cited in the file of this patent

UNITED STATES PATENTS

| | | |
|---|---|---|
| 521,246 | Perry | June 12, 1894 |
| 2,147,349 | Piquerez | Feb. 14, 1939 |
| 2,165,860 | Killmeyer | July 11, 1939 |
| 2,327,560 | Rose | Aug. 24, 1943 |
| 2,531,745 | Schopmeyer | Nov. 28, 1950 |
| 2,626,647 | Barton | Jan. 27, 1953 |